(12) United States Patent
Wald et al.

(10) Patent No.: US 11,461,132 B2
(45) Date of Patent: Oct. 4, 2022

(54) TIME BASED PRIORITY QUEUE

(71) Applicant: Huawei Technologies Co., Ltd., Shenzhen (CN)

(72) Inventors: Ayelet Wald, Munich (DE); Dan Touitou, Munich (DE); Michael Naaman, Munich (DE); Alexander Kravtsov, Hod Hasharon (IL); Michael Charny, Hod Hasharon (IL); Max Komm, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 249 days.

(21) Appl. No.: 16/847,641

(22) Filed: Apr. 13, 2020

(65) Prior Publication Data
US 2020/0241918 A1 Jul. 30, 2020

Related U.S. Application Data

(63) Continuation of application No. PCT/EP2018/078245, filed on Oct. 16, 2018.

(51) Int. Cl.
*G06F 9/46* (2006.01)
*G06F 9/48* (2006.01)
(Continued)

(52) U.S. Cl.
CPC .......... *G06F 9/4881* (2013.01); *G06F 9/321* (2013.01); *G06F 9/4818* (2013.01); *G06F 9/5027* (2013.01); *G06F 9/546* (2013.01)

(58) Field of Classification Search
CPC ...... G06F 9/4881; G06F 9/321; G06F 9/4818; G06F 9/5027; G06F 9/546
See application file for complete search history.

(56) References Cited

U.S. PATENT DOCUMENTS 6,975,629 B2 12/2005 Welin
2008/0235693 A1* 9/2008 Proctor ................. G06F 9/4881
  718/103
(Continued)

OTHER PUBLICATIONS

Tong et al, SLADE: A Smart Large-Scale Task Decomposer in Crowdsourcing, IEEE, 2018, 14 pages.*
(Continued)

*Primary Examiner* — Diem K Cao
(74) *Attorney, Agent, or Firm* — Leydig, Voit & Mayer, Ltd.

(57) ABSTRACT

A system for managing computational tasks in a queuing dataset includes at least one processor and a scheduler executed by the at least one processor. The scheduler is configured to simultaneously and circularly change an association of each of a plurality of computational task bins with a respective one of a plurality of time based priorities ordered in a fixed ascending order; receive a plurality of computational tasks; and allocate each of the plurality of computational tasks to one of the plurality of computational task bins according to a respective time constraint of the respective computational task and a current association of the plurality of computational task bins with the plurality of time based priorities. The scheduler is further configured to empty the computational task bin currently associated with the highest time based priority by sequentially outputting the computational tasks thereof.

17 Claims, 7 Drawing Sheets

(51) Int. Cl.
    *G06F 9/32*    (2018.01)
    *G06F 9/50*    (2006.01)
    *G06F 9/54*    (2006.01)

(56) References Cited

U.S. PATENT DOCUMENTS

| | | | |
|---|---|---|---|
| 2009/0083517 A1 | 3/2009 | Riddle | |
| 2010/0229179 A1 | 9/2010 | Moore et al. | |
| 2011/0173038 A1 | 7/2011 | Moon et al. | |
| 2015/0347186 A1* | 12/2015 | Truong | G06F 9/4887 718/103 |
| 2016/0044695 A1 | 2/2016 | Gunner | |
| 2019/0258514 A1* | 8/2019 | Miao | G06F 9/3855 |

OTHER PUBLICATIONS

Hoganson, "Multi-Core Real-Time Scheduling in Multilevel Feedback Queue with Starvation Mitigation (MLFQ-RT)," XP058397898, ACM SE '18, Richmond, KY, USA, pp. 1-6 (Mar. 29-31, 2018).
Groves et al., "BFS vs CFS—Scheduler Comparison," XP055549667, Retrieved from the Internet: URL:https://www.cs.unm.edu/~eschulte/classes/cs587/data/bfs-v-cfs_groves-knockel-schulte.pdf, pp. 1-12 (Dec. 11, 2009).

\* cited by examiner

TIME BASED PRIORITY QUEUE

CROSS-REFERENCE TO RELATED APPLICATIONS

This application is a continuation of International Application No. PCT/EP2018/078245, filed on Oct. 16, 2018, the disclosure of which is hereby incorporated by reference in its entirety.

BACKGROUND

The present invention, in some embodiments thereof, relates to an improvement of time prioritized task scheduling and, more specifically, but not exclusively, to an improvement of time prioritized task scheduling by using parallel time prioritized task scheduling operations. Modern computer systems may employ multi core Central Processing Units (CPU's). In order to improve efficiency, complex computations are often separated to many tasks which are assigned to several operating system threads which run independently on several cores. It may be the case that some tasks create other tasks, and/or are dependent on the resulting computation of other tasks, so tasks often need to be ordered in their execution and each assigned time dependent deadlines. A scheduler is an algorithm which determines when to process each task according to a priority or time deadline. A simple and effective design for online scheduling is a shared queueing dataset, for which various processes can insert and extract tasks, which may have each an associated priority. If task priorities are time based, then certain queueing datasets are not suitable. For instance, a simple first in first out (FIFO) queue would not update task priorities contained within it as time passes. Furthermore, multiple threads operating in parallel on shared datasets require synchronization methods such as locking of critical sections, which create significant overhead in high volume systems.

SUMMARY

The present disclosure describes systems and methods for time prioritized task scheduling using parallel atomic operations.

According to a first aspect of the disclosure, a system for managing computational tasks in a queuing dataset is provided. The dataset comprises a plurality of computational bins, associated with a plurality of time based priorities. The system comprising: at least one processor; a scheduler, executed by the at least one processor and being configured to: receive a plurality of computational tasks, each computational task being associated with a time constraint; allocate each of the plurality of computational tasks to one of the plurality of computational task bins according to the respective time constraint of the respective computational task and a current association of the plurality of computational task bins with the plurality of time based priorities; empty the computational task bin currently associated with the highest time based priority by sequentially outputting the computational tasks thereof; change an association of each of the plurality of computational task bins with a respective one of a plurality of time based priorities ordered in a fixed ascending order; wherein the scheduler is configured to perform the steps of receiving, allocating, emptying, and changing independent from one another and in an uninterruptable manner. Preferably, the step of changing an association of each of the plurality of computational task bins with a respective one of a plurality of time based priorities ordered in a fixed ascending order occurs simultaneously and circularly.

According to a second aspect of the disclosure, a method for managing computational tasks in a queuing dataset is provided, the dataset comprising a plurality of computational bins, associated with a plurality of time based priorities, the method comprising: receiving a plurality of computational tasks, each computational task being associated with a time constraint; allocating each of the plurality of computational tasks to one of the plurality of computational task bins according to the respective time constraint of the respective computational task and a current association of the plurality of computational task bins with the plurality of time based priorities; emptying the computational task bin currently associated with the highest time based priority by sequentially outputting the computational tasks thereof; changing an association of each of the plurality of computational task bins with a respective one of a plurality of time based priorities ordered in a fixed ascending order; wherein the steps of receiving, allocating, emptying, and changing are independent from one another and are each performed in an uninterruptable manner.

In a first possible implementation of the first and second aspects of the present disclosure, the ascending order of the time based priorities is maintained by applying a round robin scheme when the computational task bin currently associated with the highest time based priority is empty, and maintaining the current fixed ascending order when the computational task bin currently associated with the highest time based priority is not empty.

In a second possible implementation of the first and second aspects, the scheduler is further configured to periodically update a time stamp by incrementing a time stamp in multiples of predefined time slice intervals since the last time stamp update, employing the time stamp to determine the correct computational task bin allocations for computational tasks, in each cycle of the round robin scheme, and in associating the computational task bins to their respective computational tasks.

In a third possible implementation of the first and second aspects, optionally, the scheduler is further configured to count a current number of computational tasks in each of the plurality of computational task bins and during task processing to indicate whether a bin is empty or full, according to the respective current number of computational tasks.

In a fourth possible implementation of the first and second aspects, optionally, each time based priority comprises an index from a plurality of indices associated with the plurality of computational bins, the index corresponding to the current number of computational tasks in a corresponding computational task bin.

In a fifth possible implementation of the first and second aspects, each time based priority comprises further the time stamp, and the time based priority is represented by a combined word.

In a sixth possible implementation of the first and second aspects, optionally, the scheduler is further executed for employing the combined word in a task processing operation selected from a group comprising: updating the time stamp, updating values indexed by the plurality of indices, and round robin cycling the plurality of indices.

In a seventh possible implementation of the first and second aspects, each computational task allocated to a respective computational task bin is assigned with a task priority in a respective priority queue of the respective computational task bin.

In an eighth possible implementation of the first and second aspects, optionally, the respective priority queue is a First In First Out (FIFO).

In a ninth possible implementation of the first and second aspects, according to the computational tasks time constraints, the computational tasks of each of the plurality of computational task bins are optionally arranged in a plurality of FIFO queues each having one of a plurality of queue priorities wherein the emptying is performed according to the plurality of queue priorities.

In a tenth possible implementation of the first and second aspects, each of the plurality of bins has a corresponding tree structure, comprising inner nodes and leaf nodes, wherein each leaf node corresponds to a computational task bin and indicates the number of computational tasks in the computational task bin.

In an eleventh possible implementation of the first and second aspects, the scheduler is optionally configured to employ a plurality of time-based priority queues for each computational task bin of the plurality of computational task bins, every time-based priority queue covering a different time range.

In a twelfth possible implementation of the first and second aspects, the scheduler is optionally further executed for employing hardware level atomic operations in task processing operations selected from a group comprising: updating a time stamp, updating values indexed by a plurality of indices, round robin cycling the plurality of indices, managing a priority queue for each bin, updating a tree of counters for each of the priority queues, and managing a plurality of FIFO queues.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

The present disclosure, in some embodiments thereof, relates to an improvement of time prioritized task scheduling and, more specifically, but not exclusively, to an improvement of time prioritized task scheduling by using parallel time prioritized task scheduling operations. According to some embodiments, there are provided systems and methods in which processes produce and handle computational tasks in a time prioritized manner, and in which the computational tasks, known herein as "tasks", are subjected to time constraints, known herein as "deadlines" and "priorities", a scheduler is described which is both time efficient in executing operations, and without time expensive locking procedures while preventing deadlocks and denial of service in task processing, known herein as "starvation". When atomic hardware supported operations are considered to be executed in constant time then all queueing operations are performed in O(1) computational complexity.

According to some embodiments, the system includes a dataset and a scheduler, also referred to herein as a Time Based Priority Queue (TBPQ), executed using at least one processor that manages procedures utilizing hardware supported operations in order to improve computational complexity over existing solutions while guaranteeing queueing operations in a time prioritized manner. In addition, the scheduler supports a limitless scope of task deadlines and ranges of priorities without adding overhead, further improving on the limitations encountered in common solutions to time based queue prioritizing.

The dataset is designed as a collection of computational task bins, known herein as "bins", wherein each bin is associated with a time based priority, known herein as a "priority" which may be represented as a unique time interval. The order of bin priorities is identical to the chronological order of bin time intervals. Optionally, the time interval each bin represents is fixed in length for all the bins. The number of bins denoted herein N, and the length of time each bin represents, denoted herein as a "tick", are optionally both determined in advance, based on the length of time for most computational tasks deadlines deemed to be in. For instance, when most deadlines are expected to be within 1 second then N*tick=1 would be chosen, or N*tick equals a value larger than 1 and smaller than 1.5. Optionally, particular choices of N and tick depend on requirements of particular embodiments which may take into consideration an expected range and distribution of possible deadlines. Note that in some embodiments, the system time and task deadlines may be given by a respective operating system in any time based units, such as seconds, minutes, processor cycles, and/or the like.

The bins are maintained in a linear order, for instance descending or ascending order, whereas the location of each bin within the ascending order determines the current bin priority and the current time interval each bin represents. Optionally, the linear order may be implemented as an array whereas cells of the array represent bins, and an index of each cell within the array is an associated bin priority.

Optionally, each bin consists of or is associated with a counter which counts the number of tasks currently contained within the bin. Optionally, the queueing datasets which contain the tasks for each bin are stored separately from the respective counter.

Optionally, a time stamp is maintained for calculation of correct bins for task allocations and bin management operations. The time stamp measures, in tick units, a period between runtime start and runtime end.

Optionally, the bins are managed by the TBPQ algorithm in a round robin process, and the time stamp and bin priorities are updated together, for example as follows. In each time stamp update the bins are shifted in a circular manner such that a number of bin shifts is not greater than a number of ticks that have passed since the last time stamp update, depending on a location of the first non-empty bin (a non-empty bin is never assigned a lower priority), and the time stamp is incremented by the number of bin shifts that are performed in the current update. In this manner no task is in starvation as tasks are always extracted from a bin with the highest priority, and the bins priorities are increased as time passes.

In some embodiments, each bin may refer to a respective first in first out (FIFO) queue for allocating and managing tasks. Optionally, the TBPQ implements a priority queue for each bin as a queueing dataset for the tasks allocated therein. Optionally, each priority queue associated to a bin may be implemented as a set of FIFO queues, each assigned to a respective sub bin within the associated bin. A sub bin represents a fraction of a tick, such that when a task is allocated to a bin, it is subsequently allocated to a sub bin using a calculation based on the task deadline and the time interval the sub bin represents. Extraction operations are always executed on a non empty FIFO queue associated with a sub bin representing a time interval nearest to the current time.

Each FIFO queue has a counter for the number of tasks it contains, and task processing operations of each priority queue of each bin are executed using atomic hardware level operations.

The TBPQ may support an unlimited range for both task deadlines and in prioritization of the deadlines.

First, in order to support tasks whose deadlines are beyond the range of time intervals represented by the bins, one simple embodiment is to allocate such tasks to a bin with the lowest priority. An alternative solution is to allocate an additional dataset comprising of a plurality of FIFO queues, hereby known as a "hierarchic TBPQ". Each FIFO queue represents a time interval of N*tick, and the queues are ordered in a linear order. Tasks whose deadlines are beyond the supported time range of the bins, but within the range designated for the hierarchic TBPQ are allocated to the appropriate queue. Then, every N ticks the queue with a highest priority is emptied into the TBPQ by allocating each task into an appropriate bin and sub bin based on tasks deadlines. The algorithm then cycles the hierarchic TBPQ queues in a round robin manner in a similar way to the round robin cycling of the bins.

In some embodiments, the TBPQ may implement a tree of counters for each bin priority queue, hereby known as a "hierarchic priority" dataset, in order to support a large range of task priorities within each bin. For instance, a hierarchic priority dataset may be desired in case many tasks with close deadlines arrive in a high probability, and then it may be beneficial to implement priority queues that can differentiate various tasks by assigning them different priorities. Because words are limited in size, FIFO queue counters can manage a limited number of priorities. This limitation may be overcome by implementing a tree of counters for each priority queue. The leaves of a tree of counters are the counters for each FIFO queue of a respective priority queue, and a word at each level of a tree of counters counts the size of a sub tree of counters below it.

Existing microprocessor architectures, for example Intel® x86 microprocessor architectures and/or the like may support hardware atomic operations, for example, compare and swap (CAS) operations and floating point arithmetic computations.

The TBPQ uses hardware supported operations, such as CAS, in implementing lockless synchronicity in queueing operations, in updating counter values, and in round robin cycling of bins and of supporting datasets. In doing so the TBPQ avoids problems encountered in alternative implementations of time based prioritized queues detailed as follows.

Prioritized queueing datasets are sometimes implemented using heap datasets or multiple FIFO queues, whereas each queue is designated a priority. One drawback in heap implementations is a non-constant complexity in insertion/extraction operations, for example, an $O(\log(M))$ time for item extraction in a simple heap implementation, where M denotes the number of contained items. On the other hand, in multiple FIFO queue implementations of prioritized queues the complexity of locating a highest priority item is usually dependent upon the number of possible priorities supported by the implementation. In comparison, the TBPQ allocates/extracts tasks in $O(1)$. A further problem that may occur in heap and multiple queue solutions is starvation of low priority items, as periodically updating all item priorities may be time expensive. The TBPQ avoids starvation by round robin cycling the bins using atomic operations such as CAS, which does not add significant time complexity to queueing operations.

Finally, in some alternative solutions, synchronization requirements during allocation and extraction of items are implemented using locking procedures on a software level, and such procedures have significant overhead.

Before explaining at least one embodiment in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
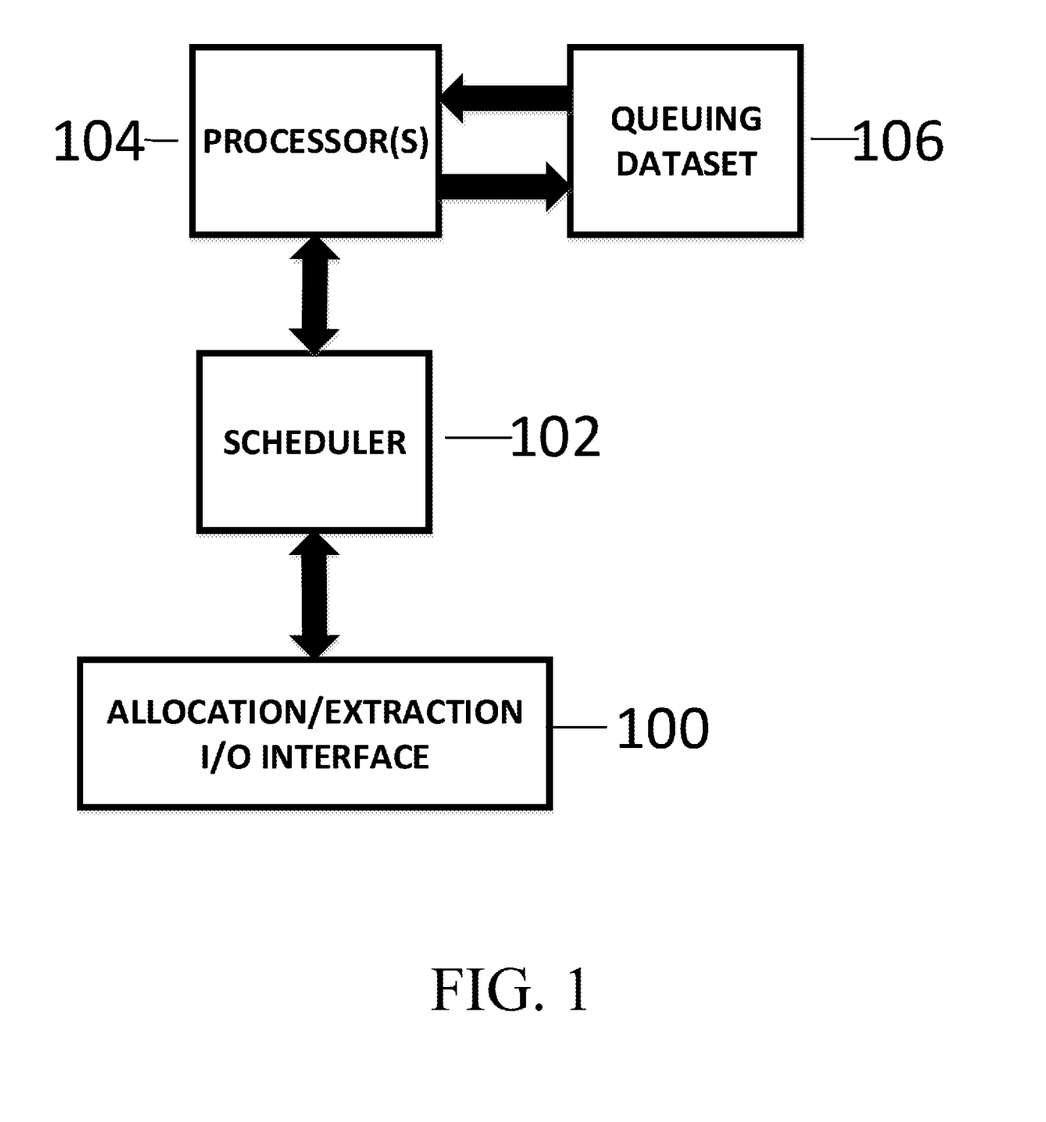
FIG. 1 is an exemplary layout of the various TBPQ system components, according to some embodiments.

Reference is now made to FIG. 1, which is a layout of the TBPQ system components. According to some embodiments, as shown in 100 and 102, task allocation and extraction I/O requests are received by the scheduler through an interface, for example by function calls triggered by multiple threads. As shown in 104 and 106, requests are then executed by the processor(s) by accessing the queueing dataset which is comprised of the bins and associated datasets. In addition, according to some embodiments, the scheduler may periodically manage the queueing dataset by using functions supported by the processor(s) such as interrupt calls and/or the like.

Figure 2:
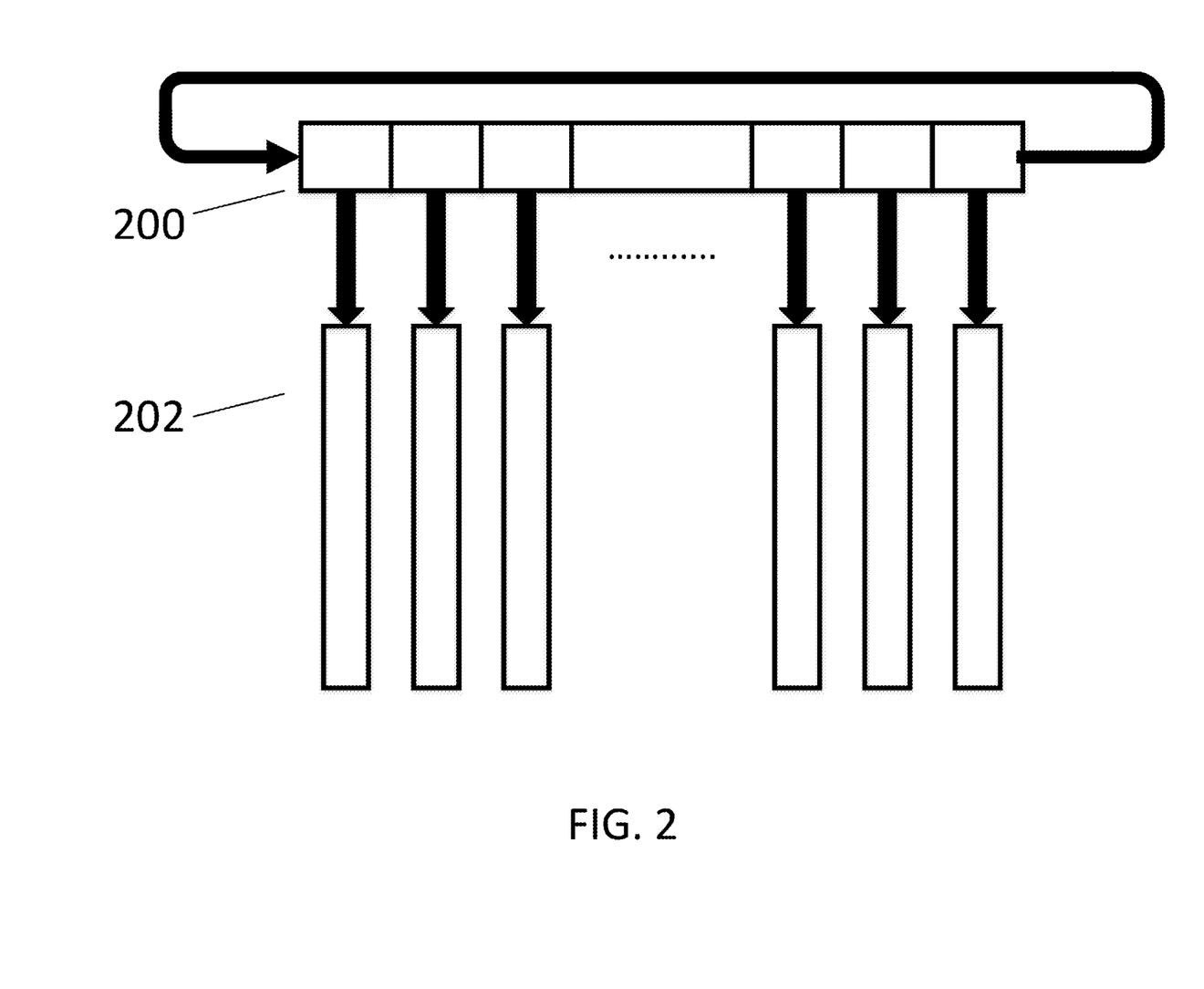
FIG. 2 is a schematic visualization of the bin structure and management, according to some embodiments.

Reference is also made to FIG. 2 which is a schematic visualization of the bin structure and management. As shown in 200, the N bins are periodically circled by the scheduler in a round robin manner in order to update bin priorities so that allocated tasks do not starve, and as schematically illustrated in 202, each bin is associated with a respective queueing dataset. In some embodiments each bin may be associated with a single FIFO queue for storing tasks.

Hereby, at time of an allocation request of task t, define the system time as T, the task deadline as D, and the time stamp value as S, whereas all three values are stored according to system defined time units (for example, ms, μs, and so on), and computations bins to be allocated to tasks are performed in tick units. It is assumed that all computation results are floored. Note that it always holds that $S \leq T$.

Figure 3:
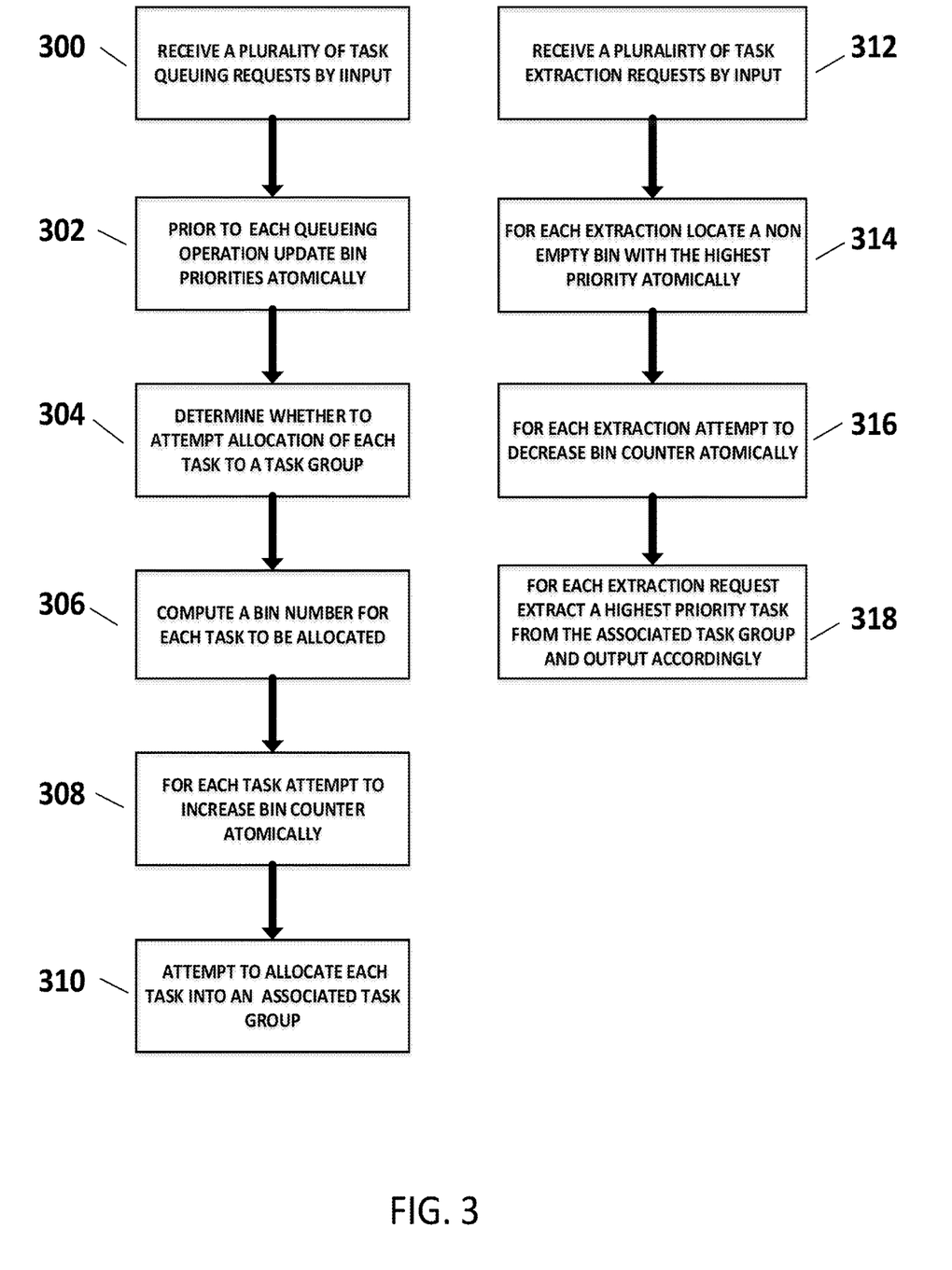
FIG. 3 is an exemplary flowchart of the independent task queuing and task extraction operations of a TBPQ, according to some embodiments.

Reference is also made to FIG. 3, which is a flowchart of the independent task queuing and task extraction operations of a TBPQ.

As shown at 302, upon a task queueing request, in some embodiments, in order to reduce time complexity, the TBPQ may update the time stamp and bin priorities together.

As shown in 304, the TBPQ determines whether to allocate a given task. If D<T then the TBPQ may assign D=T, so that starvation of tasks with past deadlines is prevented. If D>S+N*tick the TBPQ may assign D=S+N*tick, or alternatively use a hierarchic TBPQ if such a scenario is common.

Next referenced in 306, the TBPQ calculates a bin index for task allocation. Define ΔD=D−S (absolute time difference to deadline), then ΔD'=(D−S)/tick denotes the bin index for allocation relative to the current bin with the highest priority.

As shown in 308, the next step is an attempt to increase atomically the respective bin counter. Success means the bin was not full, otherwise a failure is returned. Because the increase is attempted prior to allocation, success guarantees that the respective bin is not full and no locking procedures are required to coordinate different queueing operations. Any other failure in altering the bin counter starts the insertion process again.

As referenced in 310, an allocation attempt is executed for a task which was computed to be allocated to a specific bin. Note that since the number of bin shifts is equal to the number of time stamp updates, then a task t designated for allocation may be referred to a respective bin queue dataset based on S, D and N, as follows. In some embodiments, the bins queueing datasets may be in a fixed order resembling the order of bins at start of runtime, for example, implementation as a fixed array of pointers to queues whereas the indices of pointers within the fixed array relates each queue to a bin with a corresponding priority at the start of runtime. Denote S',D' to be S, D normalized to tick units respectively, so the correct queue index for the allocation of task t is (S' mod(N)+ΔD') mod (N), where S' mod (N) is the current number of bin shifts relative to runtime start.

As shown in FIG. 3 task extraction requests may be received concurrently and independently from allocation requests. The first operation in extraction, as shown in 314, is to determine the correct bin index for task extraction. This is a first non-empty bin with the highest priority at the time of request, and if bin counters are stored together in one word according to bin priorities (as depicted, for example, in FIG. 4), then the first non-empty bin may be located by a hardware supported atomic operation by locating a first non-zero bit from Least Significant Bit (LSB) (or from most Significant Bit (MSB), depending on implementation of a bin priorities dataset). Optionally, having located the first non-zero bit, in order to locate the first non-empty bin, the TBPQ may optionally use either a modulo operation on a location of a first bin, or a translation table, in case bin counter implementations are not fixed or equal to each other. The correct queueing dataset for extraction may be calculated using the same formula as for allocation operations.

As shown in 316, the next step is an attempt to decrease the respective bin counter atomically, for example with a CAS operation. Since the operation is attempted prior to extraction, success guarantees that there is a task present in the respective bin and no locking procedures are required to coordinate different threads, whereas failure restarts the extraction procedure.

As shown in 318, upon success, the algorithm proceeds to attempt extraction of a highest priority task from the associated queueing dataset of the located bin.

Figure 4:
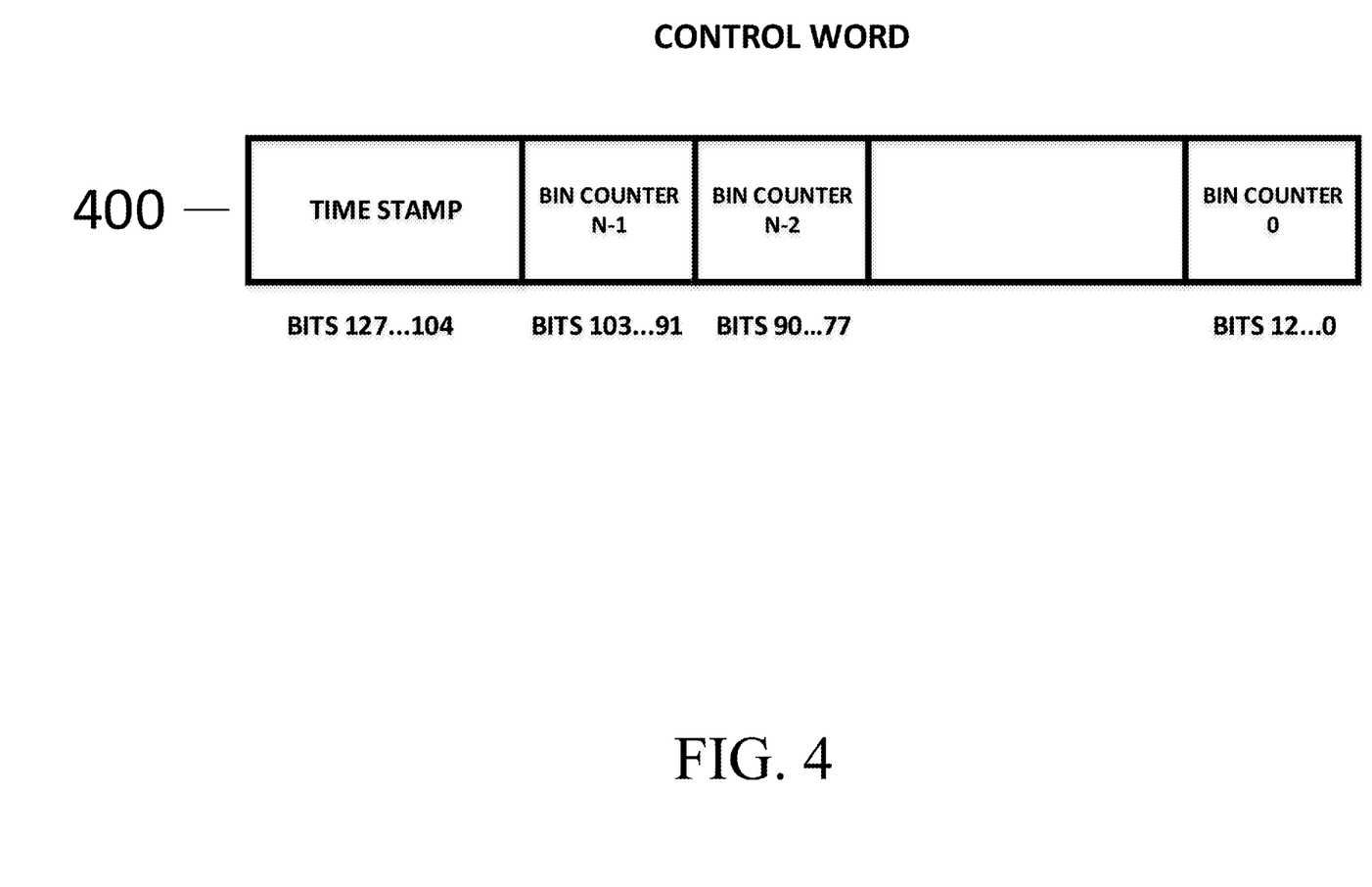
FIG. 4 is an exemplary depiction of the TBPQ control word, according to some embodiments.

In some embodiments, the time stamp and bin counters may be implemented in a combined word, hereby defined as a "control word", which enables to reduce overhead by executing both time stamp and bin priority updates in one hardware atomic lockless operation. For example, FIG. 4 is a schematic illustration of a 128 bit control word. As shown in 400, the time stamp may be encoded starting from the most significant bit, and thereafter each bin is allocated a fixed number of bits to serve as a counter for the number of tasks allocated within the queue of each bin.

According to some embodiments, indices of the bin counters within the control word may serve as the bin priorities. Both the time stamp and bin counters within the control word are each limited by the number of allocated bits, therefore the bins are limited in counting capacity, and the time stamp would wraparound at certain stages during runtime. The wraparound of the time stamp may be accounted for by forcing wraparounds of the time stamp at certain times during runtime. According to some embodiments, forcing wraparounds may take place at multiples of N ticks so an accurate mapping is maintained between bins and their respective queuing datasets, and at least N ticks before wraparounds are about to take place in order to enable correct bin allocation of any tasks whom deadlines are within N ticks at the time of a forced wraparound.

Figure 5:
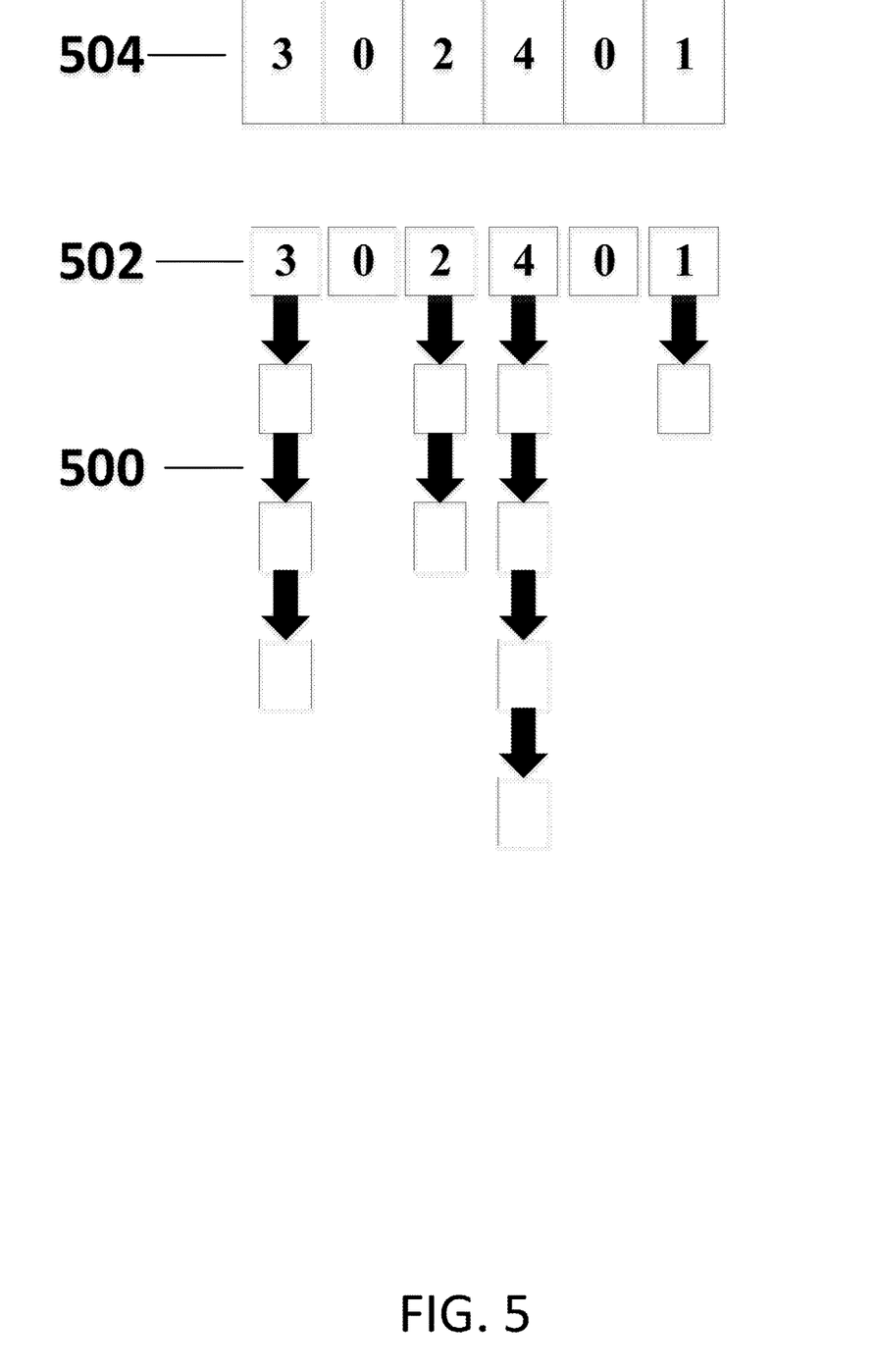
FIG. 5 is an exemplary depiction of a priority queue associated with a TBPQ bin, according to some embodiments.

As shown in an example depicted in FIG. 5, the TBPQ may implement a priority queue for each bin, consisting of a plurality of FIFO's, as seen in 500, which may be related in an ascending order, whereas each FIFO may represent a fraction of a tick within the tick represented by the respective bin. Tasks with close deadlines may be allocated to separate FIFO queues in order to increase the TBPQ efficiency. As shown in 502, each FIFO may have a counter for itself, which may enable lockless implementation of each FIFO for insertion/extraction of tasks. As shown in 504, a word containing all counters for underlying FIFO's may be maintained, and may be employed to find the highest priority non empty FIFO during extraction using hardware atomic lockless operations.

For example, consider a task t allocated to the bin depicted in FIG. 5. Since there are 6 sub bins illustrated in 502, then the sub bin for t to be allocated in is:

$$(D-S) \bmod (\text{tick}/6)$$

Figure 6:
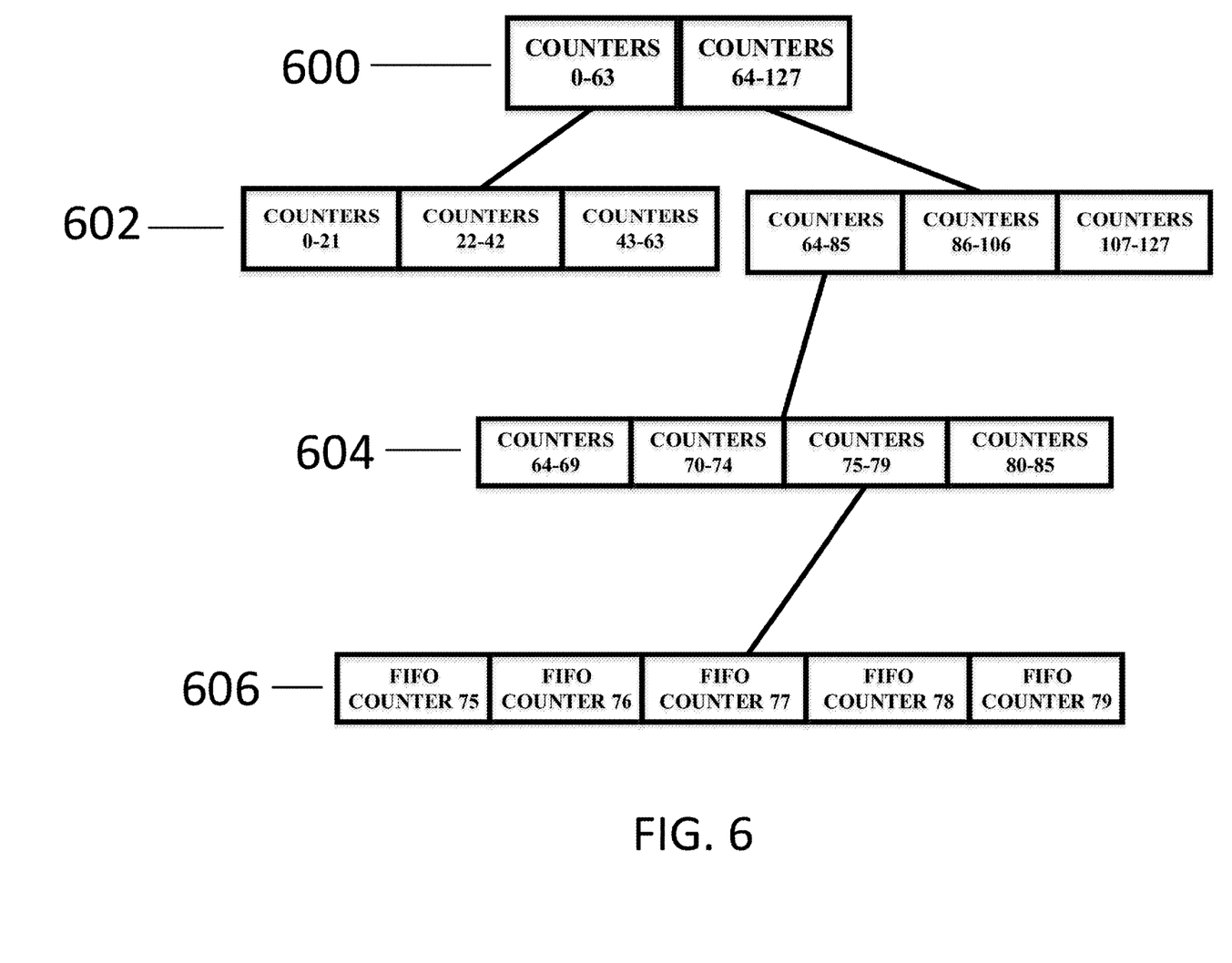
FIG. 6 is an exemplary depiction of a hierarchic priority dataset implemented as a tree of counters and associated to each bin, according to some embodiments.

As stated, the TBPQ may further implement a hierarchic priority dataset by employing a tree of counters, hereby referred to as a "tree", for each bin in order to manage a large number of FIFO's within a bins priority queue. An exemplary embodiment partially depicted in FIG. 6, shows an implementation of 128 FIFO counters, whereas the top level in 600 contains two counters, each counting the total number of tasks currently allocated in a range of FIFO's. Each counter in the tree refers to a counter below it, as partially depicted in 602,604, where each counter contains the total number of tasks within a smaller range until, as seen in 606, the leaves of the tree contain counters for individual FIFO's. Maintaining a balanced tree for a higher number of priorities requires additional atomic operations for each level in the tree.

Figure 7:
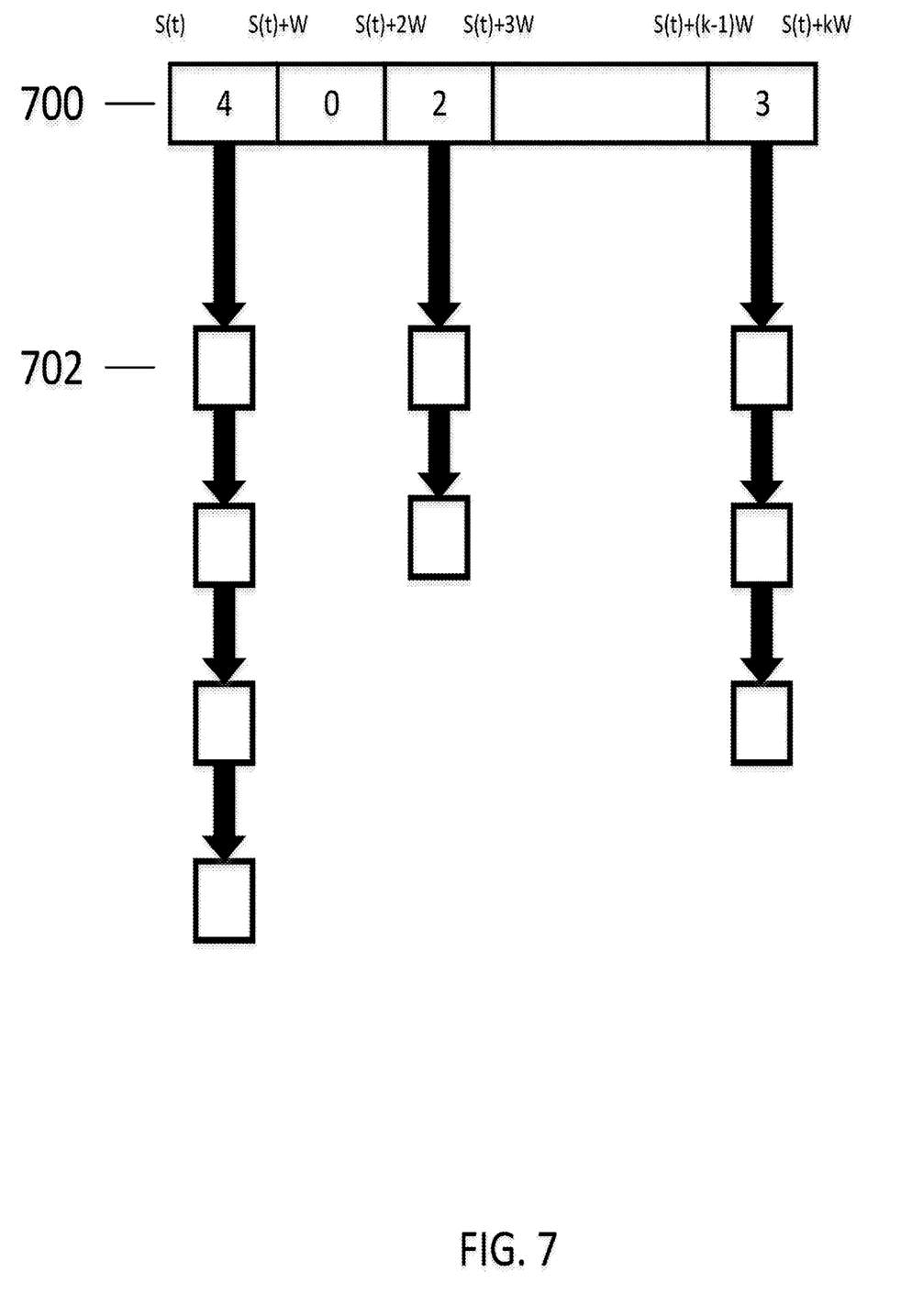
FIG. 7 is an exemplary depiction of a hierarchic TBPQ for storing tasks whose deadlines are beyond the supported range of the bins of any particular embodiment, according to some embodiments.

As stated, the present disclosure may further implement a hierarchic TBPQ for storing tasks whose deadlines are beyond the supported range of the bins as defined in any particular embodiment. Hereby, denote N*tick=W. The hierarchic TBPQ may support tasks whose deadlines are beyond S(t)+W by implementing a set of FIFO queues for time slices, each with length W, as depicted in an exemplary embodiment in FIG. 7. As seen in 700, each queue has a counter for the number of tasks contained within it, as shown in 702. For example, if a task t with a deadline of S(t)+1.5 W is to be allocated to the set of queues in FIG. 7, then t is allocated to the second queue from the left.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term time based priority queue is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features, which are, for clarity, described in the context of separate embodiments, may also be provided in combination in a single embodiment. Conversely, various features, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art. To the extent that section headings are used, they should not be construed as necessarily limiting.

What is claimed is:

1. A system for managing computational tasks in a queuing dataset, the queuing dataset comprising a plurality of computational task bins associated with a plurality of time based priorities, the system comprising:
   at least one processor; and
   a scheduler, executed by the at least one processor and being configured to:
   receive a plurality of computational tasks, each respective computational task being associated with a respective time constraint,
   allocate each respective computational task to a respective computational task bin according to the respective time constraint of the respective computational task and a current association of the plurality of computational task bins with the plurality of time based priorities,
   empty a respective computational task bin currently associated with a highest time based priority by sequentially outputting the computational tasks thereof, and
   change an association of each of the plurality of computational task bins with a respective one of a plurality of time based priorities ordered in a fixed ascending order, the fixed ascending order of the time based priorities being maintained by: applying a round robin scheme when the computational task bin currently associated with the highest time based priority is empty and maintaining the current fixed ascending order when the computational task bin currently associated with the highest time based priority is not empty;
   wherein the scheduler is configured to perform the receiving, allocating, emptying, and changing independently from one another and in an uninterruptable manner.

2. The system of claim 1, wherein the scheduler is further configured to periodically update a time stamp by incrementing the time stamp in multiples of predefined time slice intervals since a last time stamp update, employ the time stamp to determine correct computational task bin allocations for computational tasks, in each cycle of the round robin scheme, and in associating the computational task bins to their respective computational tasks.

3. The system of claim 1, wherein the scheduler is further configured to count a respective current number of computational tasks in each respective computational task bin, and during task processing, to indicate whether a respective computational task bin is empty or full, according to the respective current number of computational tasks.

4. The system of claim 3, wherein each respective time based priority of a respective computational task bin comprises a respective index from a plurality of indices associated with the plurality of computational task bins, the respective index corresponding to a current number of computational tasks in the corresponding respective computational task bin.

5. The system of claim 4, wherein each respective time based priority further comprises a time stamp, and wherein each respective time based priority is represented by a combined word.

6. The system of claim 5, wherein the scheduler is further configured to employ the combined word in a task processing operation selected from a group consisting of:
   updating the time stamp,
   updating values indexed by the plurality of indices, and
   round robin cycling the plurality of indices.

7. The system of claim 1, wherein each computational task allocated to a respective computational task bin is assigned with a task priority in a respective priority queue of the respective computational task bin.

8. The system of claim 7, wherein the respective priority queue is a First In First Out (FIFO) queue.

9. The system of claim 1, wherein according to the time constraints of the computational tasks, the computational tasks of each of the plurality of computational task bins are arranged in a plurality of First In First Out (FIFO) queues each having one of a plurality of queue priorities, wherein the emptying is performed according to the plurality of queue priorities.

10. The system of claim 1, wherein each of the plurality of computational task bins has a corresponding tree structure comprising inner nodes and leaf nodes, wherein each leaf node corresponds to a respective computational task bin and indicates a number of computational tasks in the respective computational task bin.

11. The system of claim 1, wherein the scheduler is further configured to employ hardware level atomic operations in task processing operations, the hardware level atomic operations being selected from a group comprising of:
  updating a time stamp,
  updating values indexed by a plurality of indices,
  round robin cycling the plurality of indices,
  managing a priority queue for each respective computational task bin,
  updating a tree of counters for each of a plurality of priority queues, and
  managing a plurality of FIFO queues.

12. A system for managing computational tasks in a queuing dataset, the queuing dataset comprising a plurality of computational task bins associated with a plurality of time based priorities, the system comprising:
  at least one processor; and
  a scheduler, executed by the at least one processor and being configured to:
  receive a plurality of computational tasks, each respective computational task being associated with a respective time constraint,
  allocate each respective computational task to a respective computational task bin according to the respective time constraint of the respective computational task and a current association of the plurality of computational task bins with the plurality of time based priorities,
  empty a respective computational task bin currently associated with a highest time based priority by sequentially outputting the computational tasks thereof, and
  change an association of each of the plurality of computational task bins with a respective one of a plurality of time based priorities ordered in a fixed ascending order;
  wherein the scheduler is configured to perform the receiving, allocating, emptying, and changing independently from one another and in an uninterruptable manner, and
  wherein the scheduler is further configured to employ a plurality of time-based priority queues for each computational task bin of the plurality of computational task bins, every time-based priority queue covering a different time range.

13. The system of claim 12, wherein the scheduler is further configured to count a respective current number of computational tasks in each respective computational task bin, and during task processing, to indicate whether a respective computational task bin is empty or full, according to the respective current number of computational tasks.

14. The system of claim 13, wherein each respective time based priority of a respective computational task bin comprises a respective index from a plurality of indices associated with the plurality of computational task bins, the respective index corresponding to a current number of computational tasks in the corresponding respective computational task bin.

15. The system of claim 14, wherein each respective time based priority further comprises a time stamp, and wherein each respective time based priority is represented by a combined word.

16. The system of claim 15, wherein the scheduler is further configured to employ the combined word in a task processing operation selected from a group consisting of:
  updating the time stamp,
  updating values indexed by the plurality of indices, and
  round robin cycling the plurality of indices.

17. A method for managing computational tasks in a queuing dataset, the dataset comprising a plurality of computational task bins associated with a plurality of time based priorities, the method comprising:
  receiving a plurality of computational tasks, each respective computational task being associated with a respective time constraint;
  allocating each respective computational task to one of the plurality of computational task bins according to the respective time constraint of the respective computational task and a current association of the plurality of computational task bins with the plurality of time based priorities;
  emptying a respective computational task bin currently associated with a highest time based priority by sequentially outputting the computational tasks thereof; and
  changing an association of each of the plurality of computational task bins with a respective one of a plurality of time based priorities ordered in a fixed ascending order, the fixed ascending order of the time based priorities being maintained by: applying a round robin scheme when the computational task bin currently associated with the highest time based priority is empty and maintaining the current fixed ascending order when the computational task bin currently associated with the highest time based priority is not empty,
  wherein the receiving, allocating, emptying, and changing are independent from one another and are each performed in an uninterruptable manner.

* * * * *